US009282214B2

(12) United States Patent
Sato

(10) Patent No.: US 9,282,214 B2
(45) Date of Patent: Mar. 8, 2016

(54) INFORMATION PROCESSING APPARATUS INCLUDING AN AUTHENTICATION UNIT, METHOD OF CONTROLLING THE SAME, AND STORAGE MEDIUM

(71) Applicant: CANON KABUSHIKI KAISHA, Tokyo (JP)

(72) Inventor: Kei Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/560,277

(22) Filed: Dec. 4, 2014

(65) Prior Publication Data

US 2015/0172504 A1 Jun. 18, 2015

(30) Foreign Application Priority Data

Dec. 17, 2013 (JP) ................................ 2013-260663

(51) Int. Cl.

*G06K 15/00* (2006.01)
*H04N 1/32* (2006.01)
*H04N 1/00* (2006.01)
*H04N 1/44* (2006.01)

(52) U.S. Cl.

CPC ....... *H04N 1/32026* (2013.01); *H04N 1/00474* (2013.01); *H04N 1/00482* (2013.01); *H04N 1/32021* (2013.01); *H04N 1/4433* (2013.01)

(58) Field of Classification Search

None

See application file for complete search history.

(56) References Cited

U.S. PATENT DOCUMENTS

2005/0007619 A1* 1/2005 Minato ........................ 358/1.14
2009/0265430 A1* 10/2009 Bechtel et al. ................ 709/205
2014/0063535 A1* 3/2014 Kato et al. ................... 358/1.14
2014/0075528 A1* 3/2014 Matsuoka ......................... 726/7
2014/0218764 A1* 8/2014 Murata ........................ 358/1.15

FOREIGN PATENT DOCUMENTS

JP 2006-172398 A 6/2006
JP 4745657 B2 8/2011

* cited by examiner

*Primary Examiner* — Miya J Cato

(74) *Attorney, Agent, or Firm* — Fitzpatrick, Cella, Harper & Scinto

(57) ABSTRACT

An information processing apparatus (MFP), in a state where a user is logged into the MFP as an automatic login user for which a user authentication is not required, when the user authentication is performed in order to log in as another user (a login user), compares a use authority of the automatic login user and a use authority of the login user for each function. When the result of the comparison is that there exists a function, within the functions for which usage is permitted for the automatic login user, for which the usage is not permitted for the login user, the MFP modifies the use authority of the login user for that function such that the usage of that function is permitted for the login user.

12 Claims, 9 Drawing Sheets

F I G. 8
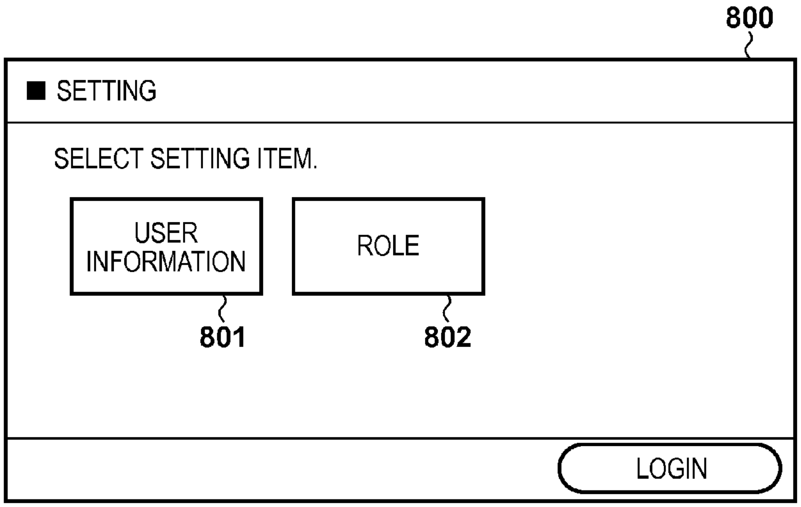
F I G. 9
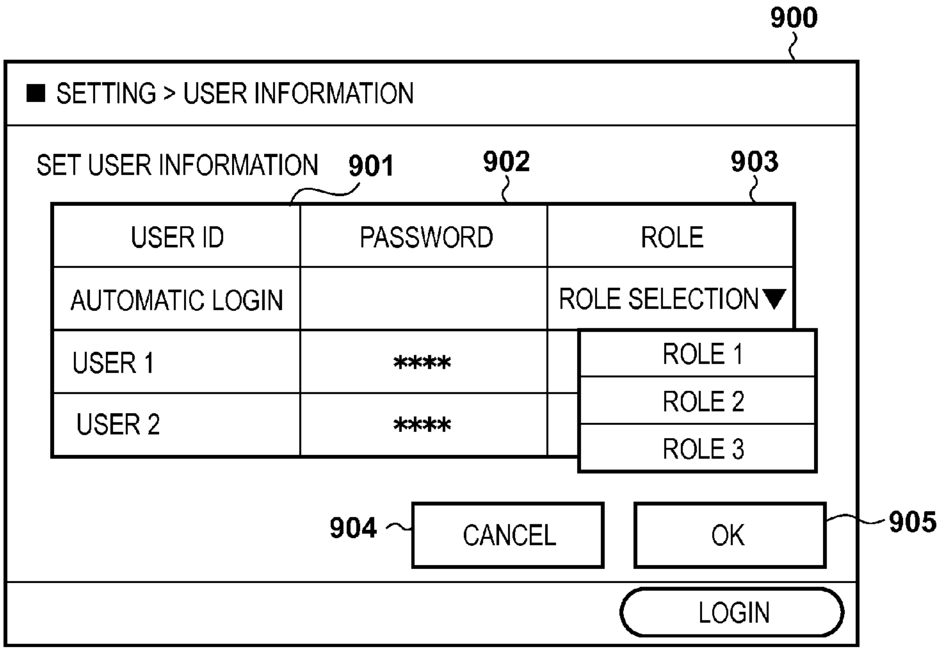

- SETTING > ROLE

SET ROLE

ROLE NAME: [_____]

| | | |
|---|---|---|
| COPY | ● PERMIT | ○ PROHIBIT |
| TRANSMISSION: | ○ PERMIT | ● PROHIBIT |
| SAVE: | ● PERMIT | ○ PROHIBIT |
| SETTING: | ● PERMIT | ○ PROHIBIT |

CANCEL — 1003
OK — 1004
LOGIN 1000, 1001, 1002

- SETTING

A USER WITH AN AUTHORITY LESS THAN THAT OF AUTOMATIC LOGIN USER EXISTS.

MODIFY AUTHORITY OF THAT USER?

NO — 1102    YES — 1103

| USER ID | PASSWORD | ROLE |
|---|---|---|
| AUTOMATIC LOGIN | | ROLE 1 |
| USER 1 | **** | ROLE 2 |
| USER 2 | **** | ROLE 3 |

| ROLE NAME | COPY | TRANSMISSION | SETTING |
|---|---|---|---|
| ROLE 1 | PERMIT | PROHIBIT | PROHIBIT |
| ROLE 2 | PROHIBIT | PERMIT | PERMIT |
| ROLE 3 | PERMIT | PERMIT | PERMIT |

INFORMATION PROCESSING APPARATUS INCLUDING AN AUTHENTICATION UNIT, METHOD OF CONTROLLING THE SAME, AND STORAGE MEDIUM

BACKGROUND OF THE INVENTION

1. Field of the Invention

The present invention relates to an information processing apparatus, a method of controlling the same, and a storage medium.

2. Description of the Related Art

In conventional multi-function peripherals (MFPs), as shown in Japanese Patent No. 4745657, for example, there exist those that enter a state upon activation in which anyone can use the multi-function peripheral without requiring a user authentication, but that require a user authentication in a case where a particular function is used. This kind of MFP is provided with a user authentication function for permitting a usage of the function only in a case where the user authentication succeeds.

Normally, in this kind of user authentication function, configuration is taken such that an administrator of the MFP can set freely the functions for which the user authentication is required from out of the plurality of functions that the MFP has in accordance with a usage status of the MFP, the user, or the like. For example, in an MFP having a copy function, a transmission function, a save function, or the like, it is possible to set such that any user can use the copy function, and that only a user A can use the transmission function, and only a user B can use the save function.

Also, amongst MFPs there are those in which a concept known as "a role", which corresponds to a user group, has been introduced in order to manage an authority for using each of the plurality functions of the MFP, collectively for a plurality of users. For example, assume that a role 1, in which usage of the transmission function is permitted and usage of the save function is prohibited, and a role 2, in which the usage of the transmission function is prohibited and the usage of the save function is permitted are registered, and the role 1, is assigned to users A and B, while the role 2, is assigned to a user C. In such a case, function control in which only the users A and B are allowed to use the transmission function, and only the user C is allowed to use the save function can be realized. Also, by simply changing the authority of the role 1, it is possible to change the authorities of the users A and B collectively, and thus the management of the authorities of the users becomes easy.

In an MFP that, upon activation, activates in a state where only limited functions can be used without a user authentication, and requires the user authentication in a case where the user uses a particular function, as described above, there is the following problem. In these kinds of MFPs, upon activation, a particular user (referred to here as "an automatic login user") logs in automatically, for example. Also, in a case where the user uses the particular function, the user is allowed to log in as another user (referred to here as "a login user"). In a case where, on an MFP that performs this kind of function control, a role is assigned to the automatic login user in order to allow the authority of the automatic login user to be changeable, it could occur that an authority of a login user is more limited than the authority of the automatic login user depending on the setting of the authorities of the roles.

For example, assume that setting is performed so that for a role 1, the usage of the transmission function is permitted, and the usage of the save function is prohibited, and for a role 2, the usage of the transmission function is prohibited and the usage of the save function is permitted, and that the role 1, is assigned to the automatic login user and the role 2, is assigned to the login user. In such a case, the user of the MFP is able to use the transmission function in the state of the automatic login prior to the user authentication, but the user authentication is required in order to use the save function. While the save function becomes useable when the user logs into the MFP as the login user by the user authentication, the transmission function, which could be used as the automatic login user prior to the authentication becomes unusable. Also, it is necessary to first log out to return to the automatic login state, in order for the user that logged in as the login user to use the transmission function.

In this way, in a case where, for each function of the MFP, it is controlled individually whether usage is permitted or not by user authentication, there is the possibility that a particular function will become unusable after authentication, depending on settings of a use authority for a function for a user prior to the authentication and settings of a use authority for the function for the user after the authentication.

SUMMARY OF THE INVENTION

The present invention was conceived in view of the above described issues. The present invention provides a technique of preventing, in an information processing apparatus that controls individually whether usage is permitted or not for each function by user authentication, a function that was usable in a state prior to a user authentication from becoming unusable after the user authentication due to a setting of a use authority.

According to one aspect of the present invention, there is provided an information processing apparatus, comprising: an authentication unit configured to perform, in a state in which a user is logged into the information processing apparatus as a first user that can use the information processing apparatus without user authentication being required, a user authentication in order for the user to log into the information processing apparatus as a second user other than the first user; a determination unit configured to, in a case where the user authentication is performed by the authentication unit, compare a use authority of the first user and a use authority of the second user for each of a plurality of functions that the information processing apparatus has, and to determine whether or not there exists a function, out of functions for which usage by the first user is permitted, for which usage is not permitted for the second user; and a modification unit configured to, in a case where it is determined by the determination unit that there exists the function, out of the functions for which usage by the first user is permitted, for which usage is not permitted for the second user, modify a use authority of the second user for the function for which usage by the second user is not permitted, so as to permit usage of the function for the second user.

According to another aspect of the present invention, there is provided a method of controlling an information processing apparatus, the method comprising: performing, in a state in which a user is logged into the information processing apparatus as a first user that can use the information processing apparatus without user authentication being required, a user authentication in order for the user to log into the information processing apparatus as a second user other than the first user; in a case where the user authentication is performed, comparing a use authority of the first user and a use authority of the second user for each of a plurality of functions that the information processing apparatus has, and determining whether or not there exists a function, out of functions for which usage by the first user is permitted, for which usage is not permitted for the second user; and in a case where it is determined that there exists the function, out of the functions for which usage by the first user is permitted, for which usage is not permitted for the second user, modifying a use authority of the second user for the function for which usage by the second user is not permitted, so as to permit usage of the function for the second user.

According to still another aspect of the present invention, there is provided a non-transitory computer-readable storage medium storing a computer program for causing a computer to execute each step of a method of controlling an information processing apparatus, the method comprising: performing, in a state in which a user is logged into the information processing apparatus as a first user that can use the information processing apparatus without user authentication being required, a user authentication in order for the user to log into the information processing apparatus as a second user other than the first user; in a case where the user authentication is performed, comparing a use authority of the first user and a use authority of the second user for each of a plurality of functions that the information processing apparatus has, and determining whether or not there exists a function, out of functions for which usage by the first user is permitted, for which usage is not permitted for the second user; and in a case where it is determined that there exists the function, out of the functions for which usage by the first user is permitted, for which usage is not permitted for the second user, modifying a use authority of the second user for the function for which usage by the second user is not permitted, so as to permit usage of the function for the second user.

By virtue of the present invention, it is possible to prevent, in an information processing apparatus that controls individually whether usage is permitted or not for each function by user authentication, a function that was usable in a state prior to a user authentication from becoming unusable after the user authentication due to a setting of a use authority. With this, convenience for a user can be improved.

Further features of the present invention will become apparent from the following description of exemplary embodiments (with reference to the attached drawings).

BRIEF DESCRIPTION OF THE DRAWINGS

FIG. 8 is a view for showing an example of a setting screen.

FIG. 9 is a view for showing an example of a user information setting screen.

FIG. 12 is a view for showing an example of user information stored in a user database 306.

FIG. 13 is a view for showing an example of role information stored in the user database 306.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Configuration>

Figure 1:
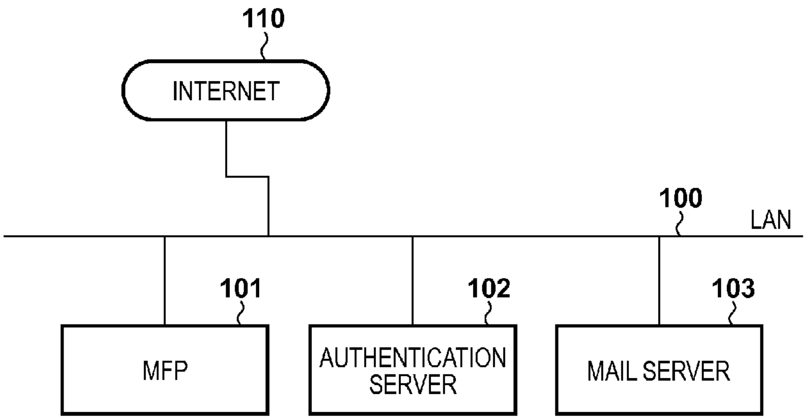
FIG. 1 is a system configuration diagram related to an MFP 101.

FIG. 1 is a block diagram for showing an example configuration of a system including an MFP 101. In the system shown in FIG. 1, the MFP 101, an authentication server 102, and a mail server 103 are connected to a LAN 100, and are able to communicate with each other via the LAN 100. The LAN 100 is connected to the Internet 110. For this reason, the MFP 101, the authentication server 102, and the mail server 103 are each able to connect to the Internet 110 via the LAN 100.

The authentication server 102 is used for authentication of users of the MFP 101 (user authentication). The mail server 103 is used when transmitting an electronic mail from the MFP 101. The MFP 101 is provided with functions such as copying, scanning, printing, transmitting, and the like. For example, the MFP 101 is able to convert an image of a scanned original into an electronic file, attach the electronic file to an electronic mail, and transmit the electronic mail to which the electronic file is attached to a designated transmission destination.

<MFP Hardware Configuration>

Figure 2:
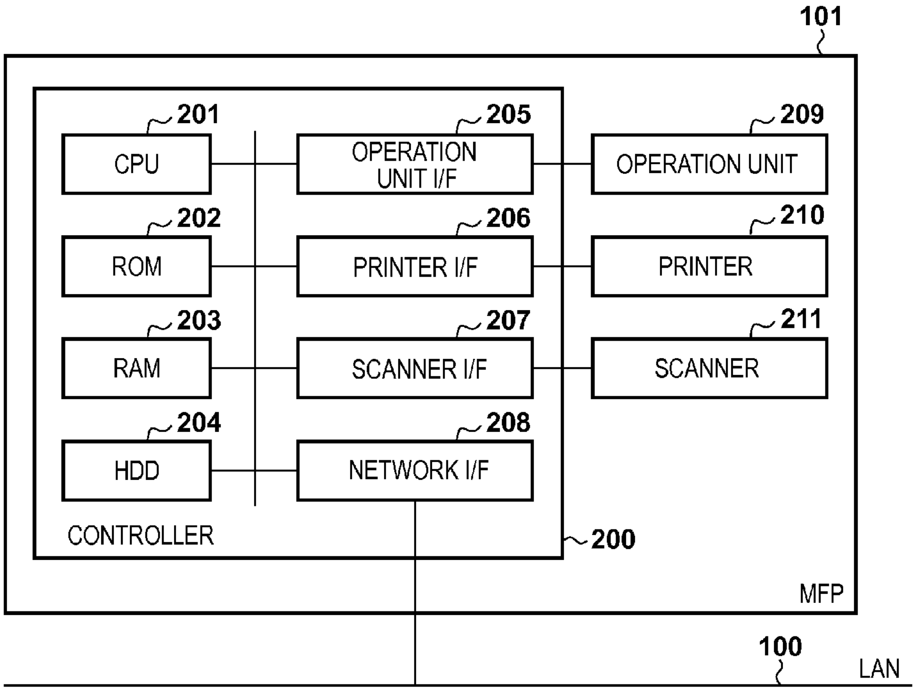
FIG. 2 is a block diagram for showing a hardware configuration of the MFP 101.

FIG. 2 is a block diagram for showing an example of a hardware configuration of the MFP 101. The MFP 101 is provided with devices such as a controller 200 for controlling overall operation of the MFP 101, an operation unit 209, a printer 210, and a scanner 211. Note, the MFP 101 is one example of an information processing apparatus of the present invention.

The controller 200 is provided with a CPU 201, a ROM 202, a RAM 203, an HDD 204, an operation unit interface (I/F) 205, a printer I/F 206, a scanner I/F 207, and a network I/F 208. The controller 200 controls overall operation of the MFP 101 by these devices. The operation unit I/F 205, the printer I/F 206, and the scanner I/F 207 are connected to the operation unit 209, the printer 210, and the scanner 211, respectively.

The CPU 201, by reading out into the RAM 203 and executing control programs stored in the ROM 202, performs various control such as reading control, and transmission control. The RAM 203 is used as a temporary storage area such as a main memory, a work area, or the like, of the CPU 201. The HDD 204 stores image data, various programs, or the like.

The operation unit I/F 205 is an interface for connecting the operation unit 209 and the controller 200. The operation unit 209, is equipped with a liquid crystal display unit having a touch panel function, a keyboard, and the like, and functions as a display device and an input device. The liquid crystal display unit functions as a display unit for displaying various kinds of information. Also, the operation unit 209 functions as a user interface (UI) for the user to input various information and instructions into the MFP 101.

The printer I/F 206 is an interface for connecting the printer 210 and the controller 200. The CPU 201 transfers image data corresponding to an image to be printed on a printing medium by the printer 210 via the printer I/F 206 to the printer 210. The printer 210 prints an image onto a printing medium based on image data received from the controller 200.

The scanner I/F 207 is an interface for connecting the scanner 211 and the controller 200. The scanner 211 generates image data by reading an image on an original and transmitting the generated image data to the controller 200 via the scanner I/F 207.

The network I/F 208 is an interface for connecting the controller 200 (the MFP 101) to the LAN 100. The network I/F 208, by performing communication with an external apparatus connected to the LAN 100 such as the authentication server 102 or the mail server 103, performs transmission and reception of various information (data) to and from the external apparatus.

<MFP Software Configuration>

Figure 3:
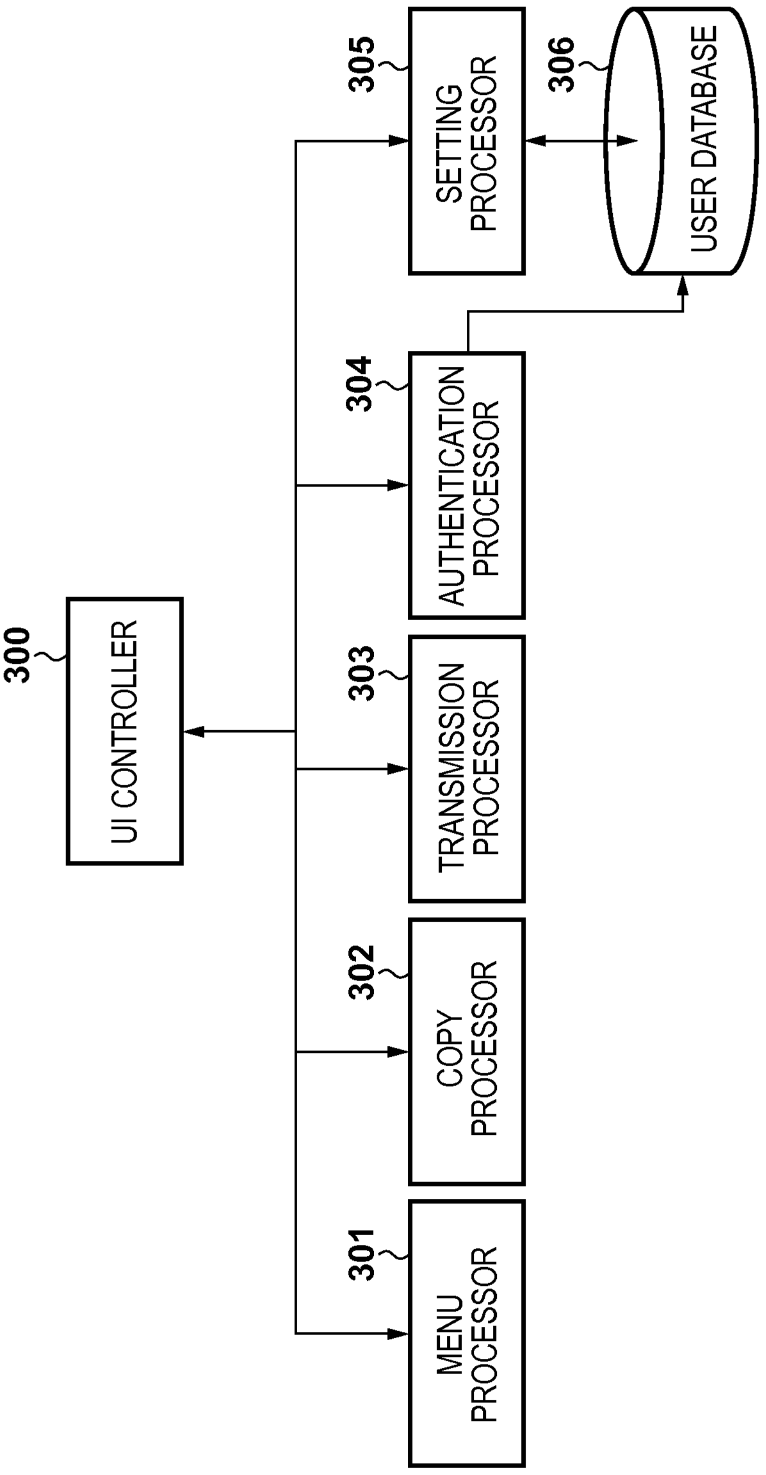
FIG. 3 is a block diagram for showing a software configuration of the MFP 101.

FIG. 3 is a block diagram for showing an example of a software configuration of the MFP 101. Software (a control program) corresponding to each functional block shown in FIG. 3 is stored in the ROM 202 or the HDD 204 of the MFP 101. Functions explained below for each functional block shown in FIG. 3 are realized on the MFP 101 by the CPU 201 executing software stored in the ROM 202 or the HDD 204. However, functions of each functional block may be realized by dedicated hardware. Note, in FIG. 3, a software configuration related in particular to the explanation of the present embodiment is shown.

As shown in FIG. 3, the MFP 101 is equipped with a UI controller 300, a menu processor 301, a copy processor 302, a transmission processor 303, an authentication processor 304, a setting processor 305, and a user database (user DB) 306, as a software configuration.

The UI controller 300 provides a function for control of the operation unit 209 via the operation unit I/F 205. The UI controller 300 notifies each of the processors 301-305 of the details of user's operation on the operation unit 209, and controls the operation unit 209 so as to display a screen corresponding to a request for a screen display when the request is received from one of the processors 301-305. In this way, the processors 301-305 normally display screens to the operation unit 209 via the UI controller 300.

The menu processor 301 provides a menu screen for accessing various functions (applications) equipped in the MFP 101. The menu processor 301 detects functions equipped in the MFP 101, and displays a main menu screen 400 (FIG. 4), which is a list of these functions, on the operation unit 209. In a case where, on the main menu screen 400, a button corresponding to one of the functions is pressed by a user, the menu processor 301 transmits a notification relating to a screen display to the processor that executes the function corresponding to the button. Furthermore, the menu processor 301 transmits an authentication request to the authentication processor 304 as necessary.

The copy processor 302 provides a function relating to copying. The copy processor 302 realizes a copy function by controlling the printer 210 via the printer I/F 206, as well as controlling the scanner 211 via the scanner I/F 207. Also, the copy processor 302 displays a copy screen 500 (FIG. 5) to the operation unit 209.

The transmission processor 303 provides a function relating to transmission. For example, the transmission processor 303 controls the scanner 211 via the scanner I/F 207 and performs a transmission of scan data to an external apparatus by transmitting the scan data obtained by the scanner 211 to the LAN 100 via the network I/F 208. Also, the transmission processor 303 displays a transmission screen 600 (FIG. 6) to the operation unit 209.

The authentication processor 304 provides a function for authenticating the user who uses the MFP 101. The authentication processor 304 displays an authentication screen 700 (FIG. 7) to the operation unit 209. The authentication processor 304 performs a user authentication by matching information input via the authentication screen 700 by a user, and information stored in the user database 306. Note, in this embodiment, the authentication processor 304 is arranged within the MFP 101, but it may be arranged within the authentication server 102. In such a case, the user database 306 may be arranged within the authentication server 102.

The setting processor 305 provides a function for setting information related to a user. The setting processor 305 displays a setting screen 800 (FIG. 8), a user information setting screen 900 (FIG. 9), a role setting screen 1000 (FIG. 10), and an authority modification confirmation screen 1100 (FIG. 11) to the operation unit 209 as operation screens for accepting instructions from users. The setting processor 305 saves information inputted via setting screens by a user into the user database 306, and displays information saved in the user database 306 in the setting screens. Also, the setting processor 305, in accordance with an instruction of a user inputted via an authority modification confirmation screen 1100 (FIG. 11), modifies information within a role information table 1300 (FIG. 13).

The user database 306 is a database in which user information which is information related to users and role information which is information related to roles is stored. In this embodiment, the user database 306 is constructed within the HDD 204. For this reason, the information stored in the user database 306 is stored in the HDD 204.

In the present embodiment, a "role" corresponds to a user group for managing collectively authorities for using each of the plurality of functions that the MFP 101 has, for a plurality of users. It is possible to register in the MFP 101 a plurality of roles each including a user(s) who is allowed to use the MFP, and it is possible to set, for each of the registered roles, a use authority for each function that the MFP 101 has. For each user belonging to a role, the use authority set for the role is applied, and a use authority that is shared between users is set for each function that the MFP 101 has. While each user belonging to a role is able to use functions for which usage is permitted for the role, the user cannot use the functions for which usage is not permitted for that role.

<User Information Example>

FIG. 12 is a view for showing an example of user information stored (saved) in the user database 306. In the user database 306, user information is stored as data in a table format as in the case of a user information table 1200, shown in FIG. 12, which is a table in which user information is stored. The information stored in the user information table 1200 is information set by a user using the user information setting screen 900 (FIG. 9), and the information is stored in the table by the setting processor 305.

A user ID 1201 corresponds to information input into a user ID field 901. A password 1202 corresponds to information input into a password field 902. A role 1203, corresponds to a role name selected in a role field 903 (a role name 1301 shown in FIG. 13).

A user for which the user ID 1201 is "automatic login" corresponds to the automatic login user. The user information of the automatic login user is pre-registered at a time of factory shipment of the MFP 101. Within the user information of the automatic login user, the user ID 1201 and the password 1202 are in an unset state at shipping, and are not set after shipment. In the present embodiment, the automatic login user is a user (a first user) who is allowed to use the MFP 101 without user authentication being required. In a case where a user uses the MFP 101 prior to performance of the user authentication, the state is such that the MFP 101 is logged into as the automatic login user. For this reason, any user can use functions for which usage is permitted for the automatic login user without being required to perform the user authentication.

Users for which the user ID 1201 is "user 1" and "user 2" are users for which the user authentication is required (hereinafter referred to as "login users"). The user information of the login users can be registered after factory shipping of the MFP 101. In the user information of the login users, the password 1202 is set for the user authentication. As shown in FIG. 12, setting is performed such that the automatic login user and the login users belong to one of the roles out of the plurality of roles (user groups) registered in the MFP 101.

<Role Information Example>

FIG. 13 is a view for showing an example of role information stored (saved) in the user database 306. In the user database 306, role information is stored as data in a table format as in the case of the role information table 1300, shown in FIG. 13, which is a table in which role information is stored. Information stored in the role information table 1300 is information that a user sets using the role setting screen 1000 (FIG. 10), and the information is stored in the table by the setting processor 305.

The role name 1301 corresponds to information input into a role name field 1001. Columns 1302-1304 each correspond to use authorities of the roles for the copy function, the transmission function, and the setting function that the MFP 101 has, and using a selection field 1002, the use authorities are set to "permit" or "prohibit". Note, in this embodiment, explanation is given with the examples of the copy function, the transmission function, and setting function as the functions (applications) that the MFP 101 has, but the MFP 101 may have other functions. For example, the MFP 101 may have a save function for saving scan data within the MFP 101 in addition to these functions.

<Screen Examples>

Next, with reference to FIG. 4 through FIG. 10, explanation will be given for an example of operation screens that are displayed on the operation unit 209 and are associated with the operation of the above described processors 301-305 in the present embodiment.

(Main Menu Screen 400)

Figure 4:
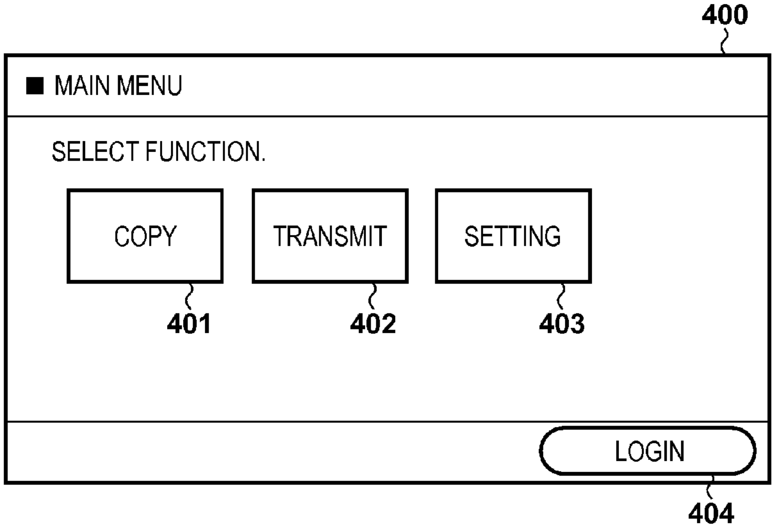
FIG. 4 is a view for showing an example of a main menu screen.

FIG. 4 is a view for illustrating an example of the main menu screen displayed on the operation unit 209 by the menu processor 301. The main menu screen 400 shown in FIG. 4 is displayed on the operation unit 209 immediately after the MFP 101 activates in this embodiment. The main menu screen 400 displays a list of functions equipped in the MFP 101. A user of the MFP 101 is able to use the functions equipped in the MFP 101 by pressing buttons 401-403 displayed on this screen.

A copy button 401 is employed for using the copy function, and when this button is pressed, the copy screen 500 is displayed on the operation unit 209. A transmit button 402 is employed to use the transmission function, and when this button is pressed, the transmission screen 600 is displayed on the operation unit 209. A setting button 403 is employed to use the setting function, and when this button is pressed, the setting screen 800 is displayed on the operation unit 209. Note, in a case where the usage of a function, corresponding to a button that the user pressed from out of the buttons 401-403, is prohibited, the UI controller 300 displays the authentication screen 700 to the operation unit 209.

A login button 404 is employed for instructing the MFP 101 to execute the user authentication, and when this button is pressed, the authentication screen 700 is displayed on the operation unit 209. Prior to performing the user authentication, the state is such that the user is logged into the MFP 101 as the automatic login user without user authentication. The login button 404 is used in a case where the user instructs the MFP 101 to execute the user authentication in order to log in as a user other than the automatic login user (for example, the user 1 or the user 2 shown in FIG. 12). In a case where the state is such that the user is logged into the MFP 101 as a user other than the automatic login user, a button for logging out from the MFP 101 is displayed on the main menu screen 400 (in other words, returning to the automatic login user) in place of the login button 404.

(Copy Screen 500)

Figure 5:
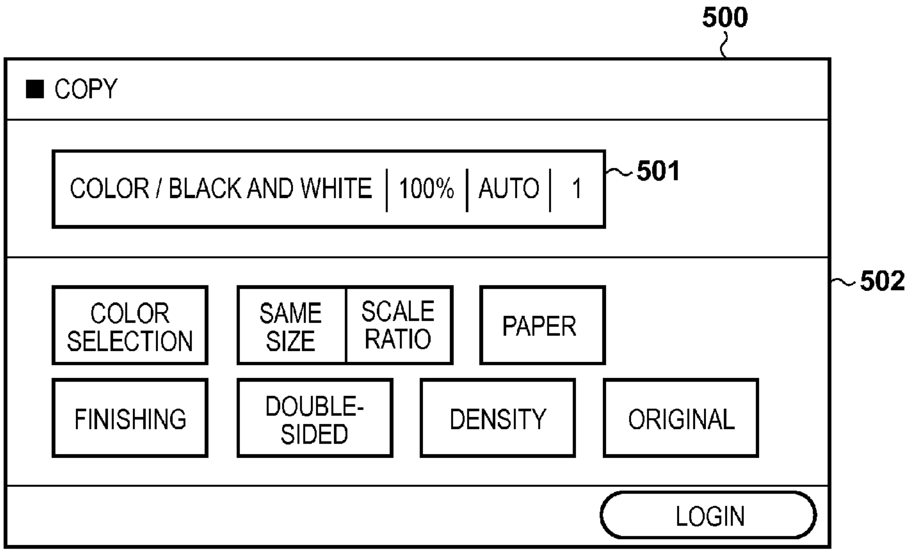
FIG. 5 is a view for showing an example of a copy screen.

FIG. 5 is a view for illustrating an example of the copy screen. The copy screen 500 shown in FIG. 5 is displayed on the operation unit 209 by the copy processor 302. A user of the MFP 101 is able to use the copy function of the MFP 101 by using the copy screen 500. On a copy setting display field 501, values that are currently set are displayed. In a copy setting field 502, buttons for performing various settings relating to the copy function are displayed.

(Transmission Screen 600)

Figure 6:
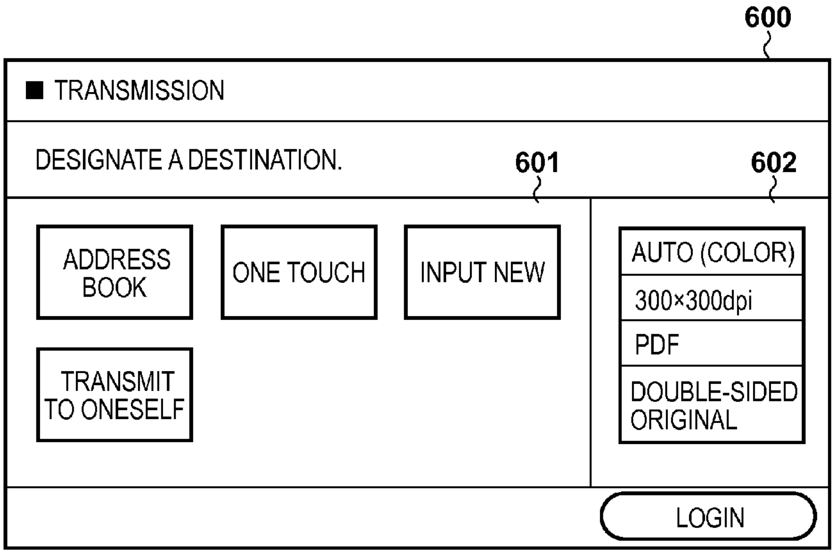
FIG. 6 is a view for showing an example of a transmission screen.

FIG. 6 is a view for illustrating an example of a transmission screen. The transmission screen 600 shown in FIG. 6 is displayed on the operation unit 209 by the transmission processor 303. A user of the MFP 101 is able to use the transmission function of the MFP 101 by using the transmission screen 600. On a destination setting field 601, buttons for setting a destination address which becomes a transmission destination for scan data are displayed. On a scan setting field 602, various settings relating to scanning are displayed.

(Authentication Screen 700)

Figure 7:
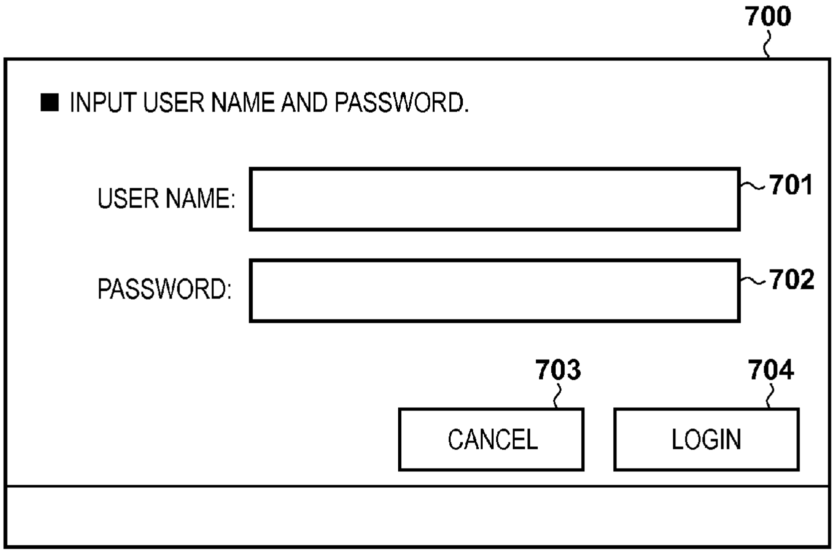
FIG. 7 is a view for showing an example of an authentication screen.

FIG. 7 is a view for illustrating an example of the authentication screen. The authentication screen 700 shown in FIG. 7 is displayed on the operation unit 209 by the authentication processor 304. A user of the MFP 101 is able to cause the MFP 101 to execute the user authentication in order to use various functions of the MFP 101 by using the authentication screen 700.

A user name input field 701 is used to input a user name. A password input field 702 is used to input a password. A cancel button 703 is used to cancel the user authentication that is being performed using the authentication screen 700. In a case where the user presses the cancel button 703, the UI controller 300 displays to the operation unit 209 a screen that had been displayed prior to displaying the authentication screen 700. A login button 704 is used to instruct execution of the user authentication. In a case where the user presses the login button 704, the authentication processor 304 executes the user authentication based on the information inputted into the user name input field 701 and the password input field 702.

(Setting Screen 800)

FIG. 8 is a view for illustrating an example of a setting screen for displaying various detailed setting items. The setting screen 800 shown in FIG. 8 is displayed on the operation unit 209 by the setting processor 305. In a case where the user presses a button 801 on the setting screen 800, the UI controller 300 displays to the operation unit 209 the user information setting screen 900. In a case where the user presses a button 802 on the setting screen 800, the UI controller 300 displays to the operation unit 209 the role setting screen 1000.

(User Information Setting Screen 900)

FIG. 9 is a view for illustrating an example of a setting screen for setting information relating to users. The user information setting screen 900 shown in FIG. 9 is displayed on the operation unit 209 by the setting processor 305. The user ID field 901 is a text field for inputting a user ID which is an identifier for uniquely identifying a user. The password field 902 is a text field for inputting a password used for authentication of the user set in the user ID field 901. The role field 903 is used for selecting the role of the user set in the user ID field 901. In the role field 903 the roles included in the role information table 1300 (role name 1301) are included as selection items, and a pull-down menu for selecting the role is displayed.

A cancel button 904 is used to cancel a setting of user information made by using the user information setting screen 900. In a case where the user presses the cancel button 904, the UI controller 300 displays the setting screen 800 to the operation unit 209. An OK button 905 is used to instruct the execution of setting based on the contents inputted into the user information setting screen 900. In a case where the user presses the OK button 905, the setting processor 305 saves the contents inputted into the user information setting screen 900 into the user information table 1200.

Note, in the user information setting screen 900, the selection of the role can be performed but the user ID and the password cannot be set for the user information of the automatic login user.

(Role Setting Screen 1000)

Figure 10:
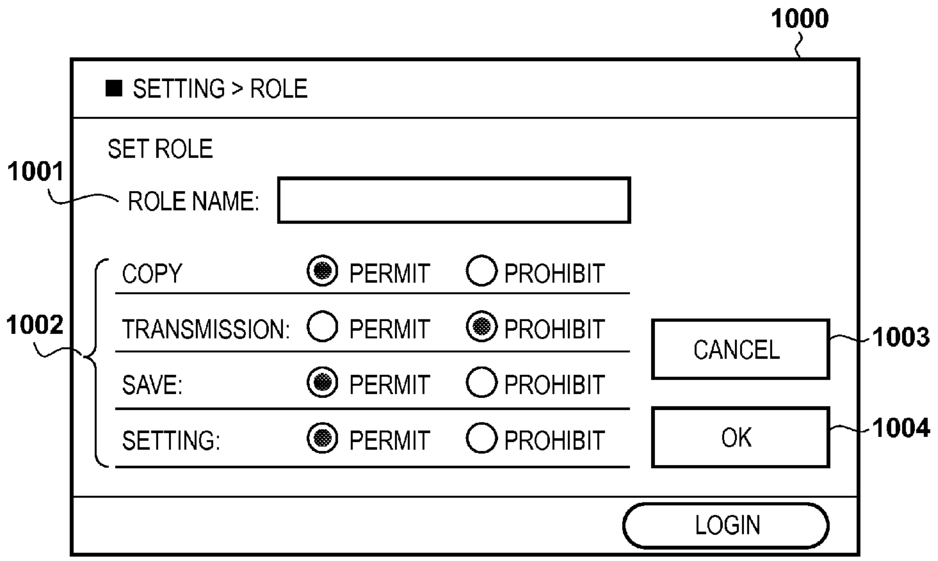
FIG. 10 is a view for showing an example of a role setting screen.

FIG. 10 is a view for illustrating an example of a setting screen for setting information relating to roles. The role setting screen 1000 shown in FIG. 10 is displayed on the operation unit 209 by the setting processor 305. A role name field 1001 is a text field for inputting an identifier for uniquely identifying a role. In a selection field 1002, radio buttons for selecting a use authority for each function (whether usage is permitted or prohibited) for the role corresponding to the identifier inputted in the role name field 1001 are displayed.

A cancel button 1003 is used to cancel a setting of role information made by using the role setting screen 1000. In a case where the user presses the cancel button 1003, the UI controller 300 displays the setting screen 800 to the operation unit 209. An OK button 1004 is used to instruct the execution of setting based on the contents inputted into the role setting screen 1000. In a case where the user presses the OK button 1004, the setting processor 305 saves the contents inputted into the role setting screen 1000 into the role information table 1300.

<Authority Information Modification Processing (Upon Login)>

In this embodiment, in order to prevent, in the MFP 101, which controls individually whether usage is permitted or not for each function by user authentication as described above, a function that was usable in a state prior to a user authentication from becoming unusable after the user authentication due to a setting of a use authority, the following processing is executed.

When, in a state in which the user is logged into the MFP 101 as the automatic login user, the user authentication is performed in order to log in as one of the login users, the CPU 201 compares a use authority of the automatic login user and a use authority of the login user for each function. When the result of the comparison is that there exists a function for which the usage is not permitted for the login user, within the functions for which usage is permitted for the automatic login user, the CPU 201 modifies the use authority of the login user for that function such that the usage of that function is permitted for the login user.

In this embodiment, the use authorities of the automatic login user and the login user for each function are managed by the above described roles. For this reason, the MFP 101 need only modifying the use authority set for the role when modifying the use authority of the function. The CPU 201, in a case where a use authority of a login user is modified for a function that the MFP 101 has, sets the function for which usage is permitted for the login user (i.e. usage is permitted for the role that the login user belongs to) to be useable in accordance with the use authority after the modification.

Figure 14:
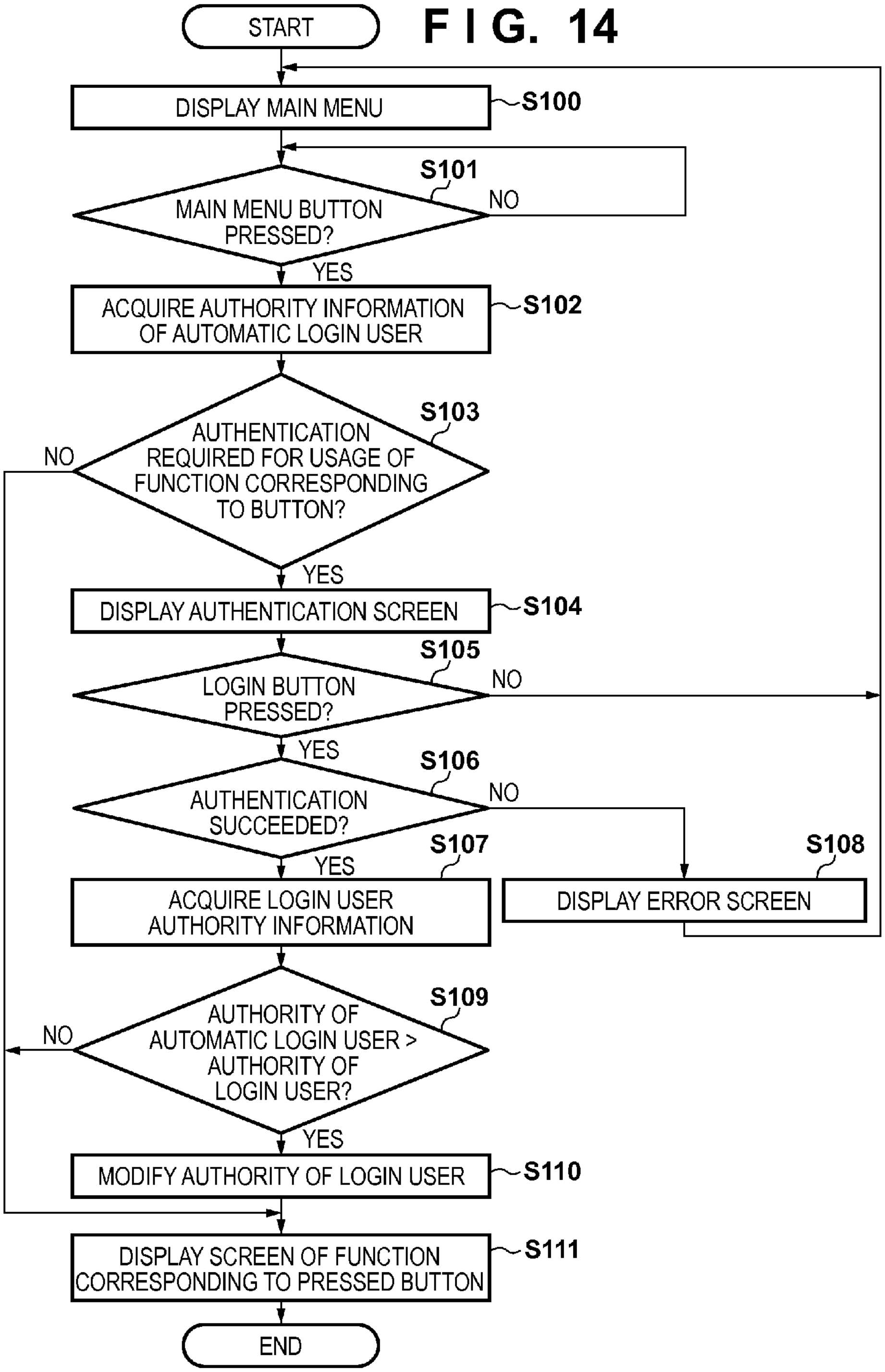
FIG. 14 is a flowchart for showing an authority information modification processing procedure performed upon user login.

Next, with reference to FIG. 14, explanation will be given for a concrete example of this kind of processing. FIG. 14 is a flowchart for showing a procedure for authority information modification processing executed by the CPU 201 in the MFP 101 upon user login. Processing of each step of FIG. 14 is realized in the MFP 101 by the CPU 201 reading into the RAM 203 and executing software that is stored in the ROM 202 or the HDD 204 (software corresponding to the functional blocks shown in FIG. 3). In other words, the processing of each step is executed by the CPU 201.

When the MFP 101 activates from a powered off state, the CPU 201 (the menu processor 301), in step S100, displays the main menu screen 400 to the operation unit 209. Next, in step S101, the CPU 201 (the menu processor 301) stands by until one of the buttons 401, 402, or 403 on the displayed main menu screen 400 is pressed by a user via the operation unit 209. The CPU 201 determines whether or not one of the buttons 401, 402, or 403 is pressed, and when the CPU 201 determines that one of the buttons 401, 402, or 403 is pressed, the CPU 201 advances the processing to step S102.

In step S102, the CPU 201 (the menu processor 301) acquires, from the user database 306, information (authority information) indicating the use authorities for each function that the MFP 101 has for the automatic login user, and after this, advances the processing to step S103. As described above, the user information table 1200 and the role information table 1300 shown in FIG. 12 and FIG. 13 are stored in the user database 306. The CPU 201, referencing the user information table 1200, refers to the role 1203 that corresponds to the user ID 1201 “automatic login”, and acquires “role 1”. Furthermore, the CPU 201, by referencing the role information table 1300, acquires authority information for the role for which the role name 1301 is “role 1”.

Next, in step S103, the CPU 201 (the menu processor 301) determines whether or not the user authentication is required in order to use the function (application) corresponding to the button pressed in step S101. Here, the CPU 201, based on the authority information acquired in step S102, confirms whether or not the usage of the function is permitted by confirming the use authority for the function set for the automatic login user. The CPU 201, in a case where the usage of the function is not permitted and the user authentication is required for the user to use the function, advances the processing to step S104, and in a case where the user authentication is not required, advances the processing to step S111. With this, the CPU 201 sets the function to be useable without performing the user authentication.

For example, in a case where the transmit button 402 is pressed by the user in step S101, the CPU 201 confirms the use authority for the transmission function in the authority information, acquired in step S102, for “role 1” which the automatic login user belongs to. As shown in FIG. 13, because the use authority of the transmission function for “role 1” is “prohibit”, the CPU 201 determines that the user authentication is required in order for the user to use the function. Also, in a case where the copy button 401 is pressed by the user in step S101, the CPU 201 confirms the use authority for the copy function in the authority information, acquired in step S102, for "role 1" which the automatic login user belongs to. As shown in FIG. 13, because the use authority of the copy function for "role 1" is "permit", the CPU 201 determines that the user authentication is not required in order for the user to use the function.

In a case where the processing proceeds to step S104 from step S103, the CPU 201 (the authentication processor 304), in step S104, displays the authentication screen 700 to the operation unit 209. Furthermore, in step S105, the CPU 201 (the authentication processor 304) determines whether the login button 704 is pressed or the cancel button 703 is pressed by the user via the operation unit 209. In the case where the login button 704 is pressed, the CPU 201 advances the processing to step S106. Meanwhile, in a case where the cancel button 703 is pressed, the CPU 201 returns the processing to step S100, and once again displays the main menu screen 400 on the operation unit 209.

In step S106, the CPU 201 (the authentication processor 304) executes the user authentication based on the user name and the password inputted via the authentication screen 700, and determines whether or not the authentication succeeds. Here, the CPU 201 executes the user authentication by matching the information inputted into the user name input field 701 and the password input field 702 of the authentication screen 700 displayed on the operation unit 209 with information included in the user information table 1200. In a case where the authentication succeeds, the processing is advanced to step S107, and in a case where the authentication fails, the processing is advanced to step S108. In this way, the CPU 201 executes the user authentication for the user to log into the MFP 101 as another user (a second user) in a state in which the user is logged into the MFP 101 as the automatic login user (a first user).

Note, in a case where in step S106 the usage of the function corresponding to the button pressed in step S101 is not permitted (is prohibited) for the role that the user, for which the user authentication succeeded, belongs to, the CPU 201 may advance the processing to step S108 treating it as thought the user authentication failed. In such a case, the CPU 201, referencing the user information table 1200, may confirm the role 1203 corresponding to the user ID 1201 of the user for which the user authentication succeeded. Furthermore, the CPU 201, referencing the role information table 1300, may confirm the authority information for the confirmed role.

In step S108, the CPU 201 (the authentication processor 304), by displaying an error screen indicating that the user authentication failed to the operation unit 209, notifies the user that the authentication failed. After this, the CPU 201 (menu processor 301) returns the processing to step S100 and displays the main menu screen 400 to the operation unit 209 once again.

Meanwhile, in step S107, the CPU 201 (the authentication processor 304) acquires from the user database 306 the authority information of the user (the login user) for which the user authentication succeeded. Next, in step S109, the CPU 201 compares the use authority of the automatic login user and the use authority of the login user for each of the plurality of functions that the MFP 101 has. Furthermore, the CPU 201 determines whether or not there exists a function for which the usage is not permitted for the login user, within the functions for which usage is permitted for the automatic login user (i.e. whether or not there exists a function for which the use authority of the login user is less than the use authority of the automatic login user).

For example, a case is envisioned in which in step S106 the user authentication as "user 1" shown in FIG. 12 succeeds (i.e., the login user is "user 1"). In such a case, from the user information table 1200 and the role information table 1300, the role that the automatic login user belongs to is "role 1", and usage of the copy function for "role 1" is permitted. Meanwhile, the role that "user 1" belongs to is "role 2", and for "role 2", the usage of the copy function is prohibited. For this reason, in step S109, the result is that the CPU 201 determines that, out of the functions for which usage is permitted for the automatic login user, there exists a function for which usage is not permitted for the login user ("user 1"). In other words, in the use authorities of the login user, there exists one which is less than the use authority of the automatic login user.

In a case where the result of the determination in step S109 is that, in the use authorities of the login user, there does not exist any use authority that is less than the use authorities of the automatic login user, the processing is advanced to step S111, and if such a use authority does exist, the processing is advanced to step S110. In step S110, the CPU 201 (the authentication processor 304) modifies (changes) the use authority of the login user, such that usage of the function that is permitted for the automatic login user but is not permitted for the login user, becomes permitted for the login user. For example, in the case of the above-described example, the CPU 201 changes the use authority for the copy function from "prohibit" to "permit" for "role 2" saved in the role information table 1300. After this, the CPU 201 advances the processing to step S111.

In a case where the processing proceeds to step S111 from step S103, step S109, or step S110, the CPU 201 (the menu processor 301), in step S111, displays to the operation unit 209 a screen to provide a function corresponding to the button pressed in step S101. This screen is, for example, the copy screen 500, the transmission screen 600, or the setting screen 800. In this way, in a case where the use authority of the login user is changed in step S110, the CPU 201, in accordance with the use authority after the change, sets so that the function, for which the usage is permitted for the login user, is useable. By the above, the CPU 201 ends the processing in accordance with the procedure shown in FIG. 14, and performs the processing in accordance with the instruction input by the user via the screen displayed to the operation unit 209.

As described above, in this embodiment, when a user logs in as a login user, the MFP 101 modifies, for each function, settings of use authorities of the login user such that there does not exist a use authority for the login user that is less than the use authority for the automatic login user. With this, it becomes possible to prevent a function that was usable in a state prior to a user authentication from becoming unusable after the user authentication due to the setting of a use authority, and it becomes possible to improve convenience for users.

<Authority Information Modification Processing (Upon User or Role Information Setting)>

Figure 15:
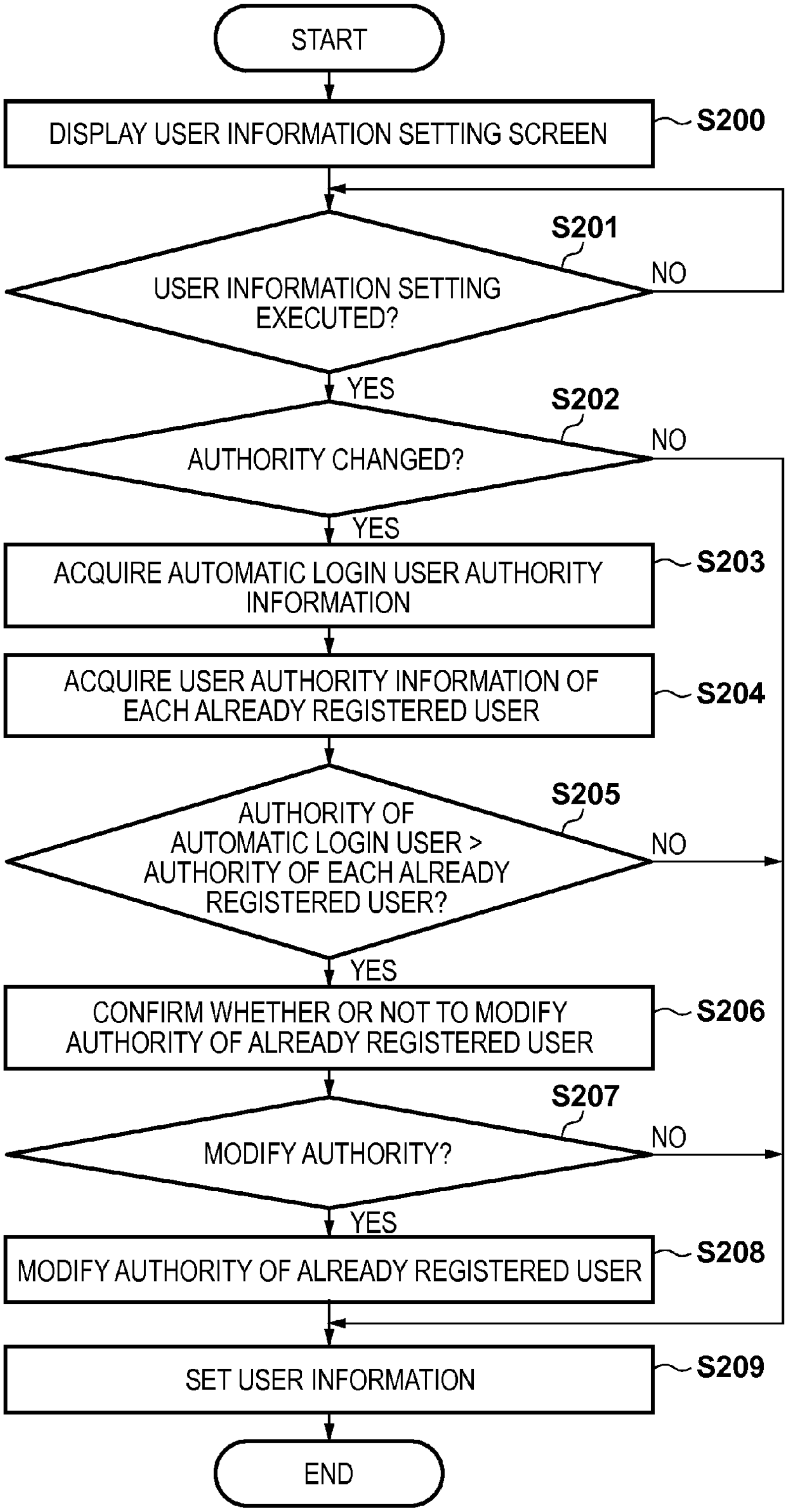
FIG. 15 is a flowchart for showing an authority information modification processing procedure performed upon user or role information setting.

For preventing the occurrence of a situation in which a function that was usable in the state prior to the user authentication becomes unusable after the user authentication due to use authority settings, it is possible to prevent this kind of situation from occurring beforehand when user or role information settings are performed. Below, with reference to FIG. 15, explanation will be given for a concrete example of this kind of processing. FIG. 15 is a flowchart for showing a procedure for authority information modification processing executed by the CPU 201 in the MFP 101 upon user or role information setting. Processing of each step of FIG. 15 is realized in the MFP 101 by the CPU 201 reading into the RAM 203 and executing software that is stored in the ROM 202 or the HDD 204 (software corresponding to the functional blocks shown in FIG. 3). In other words, the processing of each step is executed by the CPU 201.

In a state in which the MFP 101 is activated from a powered off state, when the user presses the button 403 of the main menu screen 400 and presses the button 802 of the setting screen 800, the CPU 201 executes the processing of step S200. In step S200, the CPU 201 (the setting processor 305) displays the user information setting screen 900 to the operation unit 209. Next, in step S201, the CPU 201 (the setting processor 305) stands by until the OK button 905 on the displayed user information setting screen 900 is pressed by the user via the operation unit 209. The CPU 201 determines whether or not a setting of the user information has been executed by the user (administrator) by determining whether or not the OK button 905 is pressed. When the OK button 905 is pressed, the CPU 201 advances the processing to step S202.

In step S202, the CPU 201 (the setting processor 305) confirms whether or not the use authorities of each user, for the functions of the MFP 101, are changed in accordance with the instruction of the user. For example, the CPU 201 confirms whether or not the setting of the role field 903 in the user information setting screen 900 is changed. Note, the CPU 201 may, in addition to displaying the role setting screen 1000 in step S200, confirm, in step S202, whether or not a use authority of a function has been changed for any of the roles in the role setting screen 1000. The CPU 201, in a case where it is determined that a use authority for one of the users is changed for a function of the MFP 101, advances the processing to step S203, and in a case where it is determined that the use authorities have not been changed, the processing is advanced to step S209.

In step S203, the CPU 201 (the setting processor 305), as similar to step S102, acquires, from the user database 306, information (authority information) indicating use authorities for each of the functions that the MFP 101 has for the automatic login user. Furthermore, in step S204, the CPU 201 (the setting processor 305) acquires, from the user database 306, authority information, which is registered in the user database 306, for each function that the MFP 101 has for each user other than the automatic login user. Here, authority information registered in the user database 306 may be acquired for all of the users other than the automatic login user for which the user authentication is required.

Next, in step S205, the CPU 201 (the setting processor 305), for each of the plurality of functions that the MFP 101 has, compares the use authority of the automatic login user, and the use authorities of each of the users that are registered. Furthermore, the CPU 201 determines whether or not there exists a function for which the usage is not permitted for one of the registered users, within the functions for which usage is permitted for the automatic login user (i.e. whether or not there exists a use authority of one of the registered users that is less than the use authority of the automatic login user). In a case where the result of the determination in step S205 is that there does not exist a use authority of one of the registered users that is less than the use authority of the automatic login user, the processing advances to step S209, and in a case where such a use authority exists, the processing advances to step S206.

Figure 11:
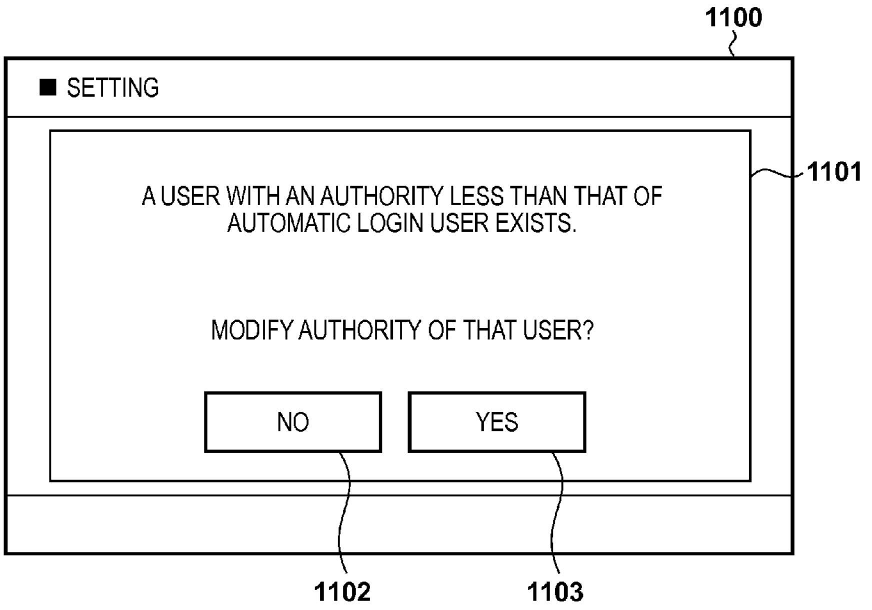
FIG. 11 is a view for showing an example of an authority modification confirmation screen.

In step S206, the CPU 201 (the setting processor 305) displays the authority modification confirmation screen 1100 shown in FIG. 11 to the operation unit 209. With this, the CPU 201 confirms, with the user currently operating the MFP 101, whether or not a use authority of the registered user having a use authority less than the automatic login user for a function of the MFP 101 is to be modified. Furthermore, in step S207, the CPU 201 determines whether or not to modify the use authority of the registered user, by determining whether a YES button 1103 is pressed or a NO button 1102 is pressed by the user on the authority modification confirmation screen 1100. In a case where the CPU 201 determines that the YES button 1103 is pressed, the processing is advanced to step S208, and in a case where the CPU 201 determines that the NO button 1102 is pressed, the processing is advanced to step S209.

In step S208, the CPU 201 (the setting processor 305) modifies (changes) the use authority of the registered user, such that the usage of the function that is permitted for the automatic login user but is not permitted for the registered user, becomes permitted for the registered user. After this, the processing is advanced to step S209.

In step S209, the CPU 201 (the setting processor 305) saves the user information (or the role information) set using the user information setting screen 900 (or the role setting screen 1000) into the user database 306, and the process is terminated.

Note, when the user or role information setting is performed, in a case where it is set in advance that the authority information should be modified automatically as necessary without performance of the confirmation with the user, the confirmation processing of step S206 and step S207 may be omitted.

As described above, in this embodiment, when a setting of user or role information is performed, the MFP 101 modifies a setting of a use authority of a registered user so that no use authority of a registered user that is less than the use authority of the automatic login user exists. With this, it is possible to prevent a situation from occurring in which a function that was usable in the state prior to a user authentication becomes unusable after a user authentication due to use authority settings in the MFP 101.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-260663, filed Dec. 17, 2013, which is hereby incorporated by reference herein in its entirety.

What is claimed is:

1. An information processing apparatus, comprising:

an authentication unit including a processor configured to execute process steps stored in a non-transitory computer-readable memory to, in a state in which a user is logged into the information processing apparatus as a first user that can use the information processing apparatus without user authentication being required, perform a user authentication in order for the user to log into the information processing apparatus as a second user other than the first user;

a determination unit including a processor configured to execute process steps stored in the memory to, in a case where the user authentication is performed by the authentication unit, compare a use authority of the first user and a use authority of the second user for each of a plurality of functions that the information processing apparatus has, and determine whether or not there exists a function, out of functions for which usage by the first user is permitted, for which usage is not permitted for the second user; and a modification unit including a processor configured to execute process steps stored in the memory to, in a case where it is determined by the determination unit that there exists the function, out of the functions for which usage by the first user is permitted, for which usage is not permitted for the second user, modify a use authority of the second user for the function for which usage by the second user is not permitted, so as to permit usage of the function for the second user.

2. The information processing apparatus according to claim 1, further comprising a control unit including a processor configured to execute process steps stored in the memory to, in a case where the use authority of the second user is modified by the modification unit, set the function, for which usage by the second user is permitted, to be useable in accordance with the use authority after the modification.

3. The information processing apparatus according to claim 2, further comprising an instruction unit including a processor configured to execute process steps stored in the memory to, in the state in which the user is logged into the information processing apparatus as the first user, accept an instruction of the user for using one of the plurality of functions, wherein the authentication unit is configured to: in a case where usage of the function indicated by the instruction is permitted for the first user, not perform the user authentication; and in a case where usage of the function indicated by the instruction is not permitted for the first user, perform the user authentication in order for the user to log into the information processing apparatus as the second user.

4. The information processing apparatus according to claim 1, wherein in the information processing apparatus, a plurality of user groups each including users that can use the information processing apparatus are registered, and, for each registered user group, a use authority is set for each of the plurality of functions, and the first and second users are set to belong to a first and second group respectively out of the plurality of user groups.

5. The information processing apparatus according to claim 4, wherein the modification unit is configured to modify a use authority of the second user group for a function for which usage is not permitted for the second user group, out of functions for which usage is permitted for the first user group, so that usage of that function is permitted for the second user group.

6. The information processing apparatus according to claim 1, further comprising a change unit including a processor configured to execute process steps stored in the memory to change a use authority of a user for one of the plurality of functions set for the information processing apparatus in accordance with an instruction of a user, wherein the modification unit is further configured to, in a case where the change of the use authority of the user is performed by the change unit, modify a use authority of the second user for a function for which usage is not permitted for the second user, out of functions for which usage is permitted for the first user, so that usage of that function is permitted for the second user.

7. The information processing apparatus according to claim 1, further comprising:

a change unit including a processor configured to execute process steps stored in the memory to change a use authority of a user for one of the plurality of functions set for the information processing apparatus in accordance with an instruction of a user; and a confirmation unit including a processor configured to execute process steps stored in the memory to, in a case where the change of the use authority of the user is performed by the change unit and there exists a function, out of functions for which usage by the first user is permitted, for which usage is not permitted for the second user, confirm with the user whether or not to modify a use authority of the second user, wherein the modification unit is further configured to, in a case where it is confirmed by the confirmation unit that the use authority of the second user is to be modified, modify the use authority of the second user for the function for which usage is not permitted for the second user, from out of functions for which usage is permitted for the first user, so that usage of that function is permitted for the second user.

8. The information processing apparatus according to claim 6, wherein the second user includes all users other than the first user, which are registered in the information processing apparatus and for which the user authentication is required.

9. The information processing apparatus according to claim 1, wherein, upon activation from a powered off state, the information processing apparatus activates in a state in which the user automatically logs in as the first user.

10. The information processing apparatus according to claim 1, wherein the first user is a user pre-registered in the information processing apparatus at a time of factory shipment of the information processing apparatus, and the second user is a user which is registered after factory shipment and for which the user authentication is required.

11. A method of controlling an information processing apparatus, the method comprising:

performing, in a state in which a user is logged into the information processing apparatus as a first user that can use the information processing apparatus without user authentication being required, a user authentication in order for the user to log into the information processing apparatus as a second user other than the first user;

in a case where the user authentication is performed, comparing a use authority of the first user and a use authority of the second user for each of a plurality of functions that the information processing apparatus has, and determining whether or not there exists a function, out of functions for which usage by the first user is permitted, for which usage is not permitted for the second user; and in a case where it is determined that there exists the function, out of the functions for which usage by the first user is permitted, for which usage is not permitted for the second user, modifying a use authority of the second user for the function for which usage by the second user is not permitted, so as to permit usage of the function for the second user.

12. A non-transitory computer-readable storage medium storing a computer program for causing a computer to execute each step of a method of controlling an information processing apparatus, the method comprising:

performing, in a state in which a user is logged into the information processing apparatus as a first user that can use the information processing apparatus without user authentication being required, a user authentication in order for the user to log into the information processing apparatus as a second user other than the first user;

in a case where the user authentication is performed, comparing a use authority of the first user and a use authority of the second user for each of a plurality of functions that the information processing apparatus has, and determining whether or not there exists a function, out of functions for which usage by the first user is permitted, for which usage is not permitted for the second user; and in a case where it is determined that there exists the function, out of the functions for which usage by the first user is permitted, for which usage is not permitted for the second user, modifying a use authority of the second user for the function for which usage by the second user is not permitted, so as to permit usage of the function for the second user.

* * * * *